United States Patent [19]

Keeney

[11] 4,013,296

[45] Mar. 22, 1977

[54] PHONOGRAPH RECORD STORAGE AND PROTECTION APPARATUS

[76] Inventor: Malcolm S. Keeney, 8727 Bay Pointe Drive, Tampa, Fla. 33615

[22] Filed: Dec. 8, 1975

[21] Appl. No.: 638,320

[52] U.S. Cl. .............................. 274/42 R; 206/309; 206/400; 206/506

[51] Int. Cl.$^2$ ......................................... G11B 3/68

[58] Field of Search ......... 274/42 R; 206/309, 398, 206/400, 806

[56] References Cited

UNITED STATES PATENTS

| | | | |
|---|---|---|---|
| 1,675,852 | 7/1928 | Geer | 274/42 R |
| 2,285,139 | 6/1942 | Andres | 274/42 R |
| 2,344,919 | 3/1944 | Kelly | 274/42 R |
| 3,169,023 | 2/1965 | Rivas | 274/42 R |
| 3,429,629 | 2/1969 | Cilia | 206/309 X |
| 3,525,427 | 8/1970 | Kulka | 206/400 |
| 3,667,595 | 6/1972 | Posso | 206/400 |

FOREIGN PATENTS OR APPLICATIONS

| | | | |
|---|---|---|---|
| 1,170,899 | 1/1959 | France | 274/42 R |
| 855,772 | 11/1952 | Germany | 274/42 R |

Primary Examiner—Charles E. Phillips
Attorney, Agent, or Firm—Robert F. Ruemeli

[57] ABSTRACT

A phonograph record is provided with a ring on its rim, the ring being of greater thickness than the record and extending outwardly from both faces of the record to protect the grooved record face from adjacent records on a record player, and when the records are stored in a stack or a rack. Generally radial ribs are spaced circumferentially apart on the opposite faces of the ring to prevent relative rotation of stacked records on a turn table. A gap is formed in the ring and is spanned by an outwardly arched band, the arching of the band being decreased as the ring expands to accommodate records of increasing diameter. A novel record storage is provided by suspending the records from hooks, or the like, which receive the arched bands, and if desired eyes may be formed integrally with the bands in order to more conveniently suspend the records in facially opposed relationship.

8 Claims, 5 Drawing Figures

PHONOGRAPH RECORD STORAGE AND PROTECTION APPARATUS

This invention relates to apparatus for storing and protecting phonograph records and, more particularly, to such an apparatus for avoiding damage to the record grooves when a stack of records is received on a record player or when the records are stored, and provides suspended storage of the records.

BRIEF DESCRIPTION OF THE INVENTION

The invention is, in brief, directed to a protective ring for phonograph records and to provision for conveniently storing the records. A protective ring has an inwardly opening groove which receives the rim of the record and is firmly seated thereon by a slight resiliency of the ring. A gap in the ring is spanned by an arched band of smaller cross section than the ring to permit slight expansion of the ring for accommodating records of slightly different diameters. The band and gap permit suspending the records from hooks, or the like, and the band or other portion of the ring may include a generally radially outwardly extending transverse eye for more convenient reception on the hook. A record support preferably has a series of hooks, each hook for suspending one of the records with the records facially opposed to each other.

It is an object of this invention to provide a new and useful accessory for phonograph records, or the like. Another object is to provide a new and useful way of storing phonograph records. A related object is provision of a new and useful accessory for protecting phonograph records during storage and while in use on a record player.

Still another object is provision of a new and useful phonograph record accessory in the form of a ring encircling and seated on the rim of the record, and of greater thickness than the record for preventing adjacent records from engaging each other. A related object is provision on the ring for effectively preventing relative rotation between adjacent records on a record player. A further related object is provision of such a ring which is slightly resilient for receiving records of slightly different diameters and is sufficiently rigid to prevent twisting of the ring laterally of the record. A further related object is provision of a gap in the ring, the gap being spanned by an arched band to facilitate expansion of the ring for receiving records of slightly different diameters and firmly seating the ring on the rim of the record with the band adapted to be received by a hook, or the like, for suspending the record during storage. Still another object is provision of an eye transverse to the plane of the record and formed integrally with the band or another portion of the ring for more conveniently suspending the record.

These and other objects and advantages of the invention will be apparent from the following description and the accompanying drawing.

BRIEF DESCRIPTION OF THE DRAWING

FIG. 5 is a fragmentary, elevational view of storage apparatus for suspending the records and accessories from hooks, or the like.

DESCRIPTION OF THE ILLUSTRATED EMBODIMENT

Figure 1:
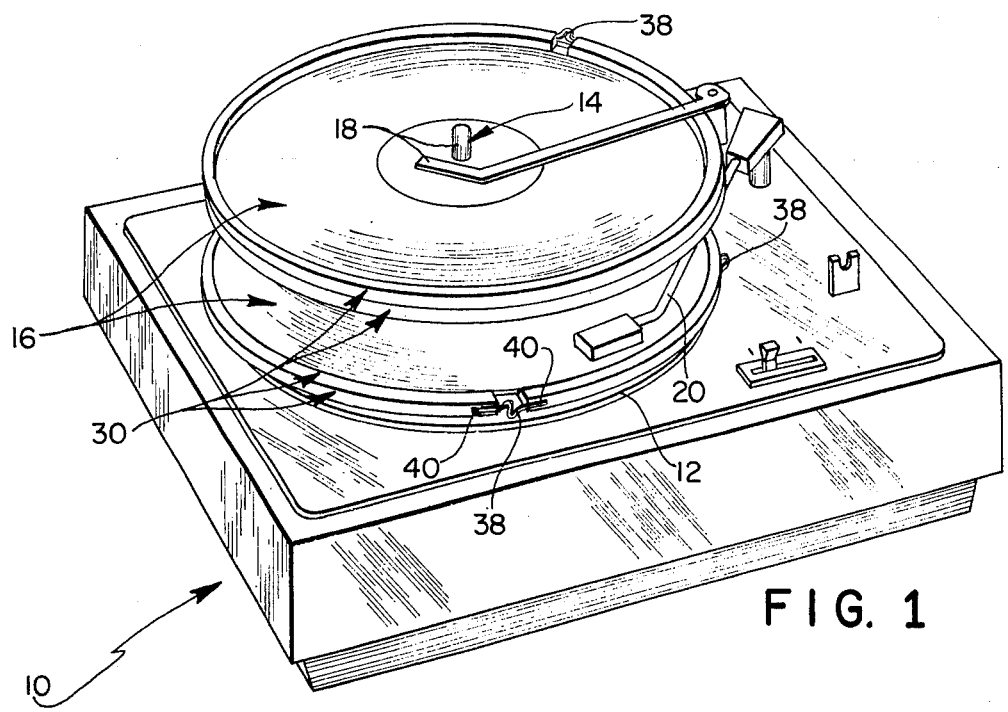
FIG. 1 is a schematic, perspective view of a typical record player and changer, illustrating a preferred embodiment of the phonograph record accessory.

Referring to FIG. 1 of the drawing, a typical record player and changer 10 has the usual turntable 12 and a spindle 14 for receiving the center hole in a plurality of records 16, two of the records being on the turntable and additional records being on a changer portion 18 of the record player 10. A typical tone arm 20 has a cartridge 22 (FIG. 3) which carries a needle 24 received in the usual grooves 26 of the record faces 28.

Figure 5:
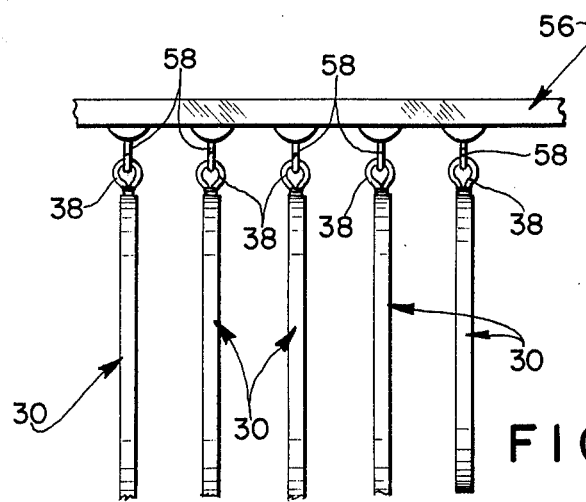

A record protector and storage accessory is illustrated in the form of a ring 30, one for each of the records 16, preventing the records from engaging each other when they are stacked during storage or on the record player 10, and for suspending the records during storage (FIG. 5).

Figure 2:
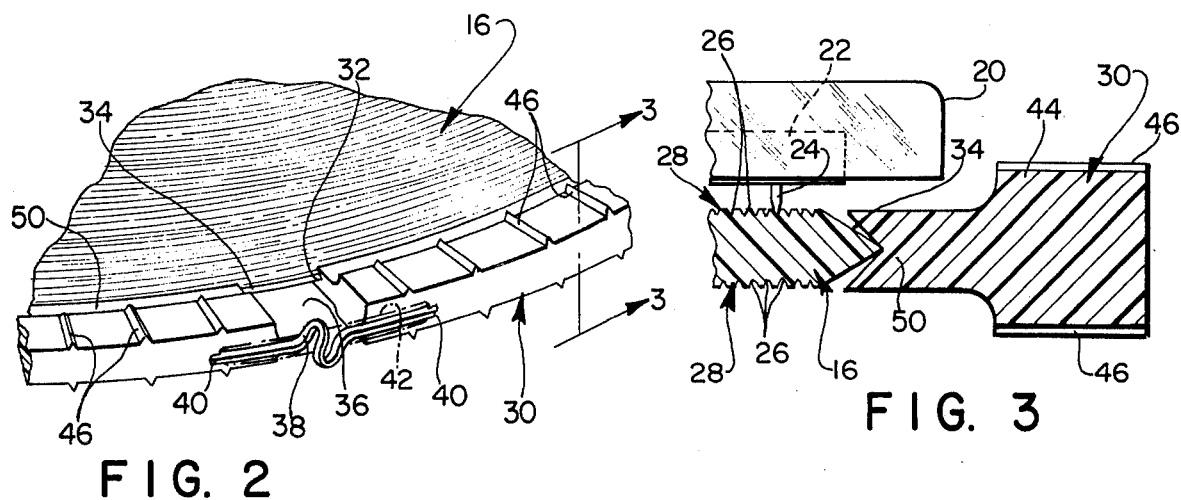
FIG. 2 is an enlarged, fragmentary perspective view of a rim portion of one of the records and accessory shown in FIG. 1 but removed from the record player.
Figure 3:
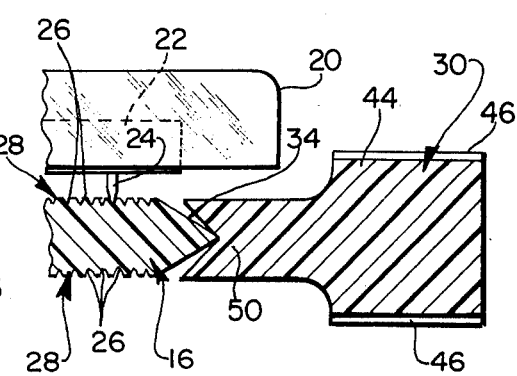
FIG. 3 is an enlarged, fragmentary vertical sectional view taken generally along the line 3—3 in FIG. 2.

With particular reference to FIGS. 2 and 3, each ring 30 encircles its associated record 16 and has an inwardly opening circumferential groove 32 which receives the rim portion 34 of the record 16. A gap 36 (FIG. 2) extends generally radially through the ring 30 and a band 38 spans the gap and is integral with opposite portions of the ring adjacent the gap. Band 38 is substantially thinner and of smaller cross sectional size than the ring 30 and is arched outwardly so that the ring may be expanded through flatting of the arch of the band 38, to accommodate record 16 of slightly different diameters. Ring 30 and band 38 are integral with each other and are preferably formed of a slightly resilient, but relatively rigid plastic material. The band 38 is shaped to form an open eye for facilitating stretching of the band and for hanging the records, as will be described later.

Should the band 38 be inadequate for closing the gap 36 sufficiently for unusually small diameter records, a pair of hooks 40 (FIG. 2) is provided on the outer periphery of the ring at outer ends of the band 38, for receiving a rubber band 42 (phantom lines) to further close the gap and reduce the ring diameter.

The cross section of the body of the ring 30 may be seen most clearly in FIG. 3 wherein an outer annular portion of 44 of the ring is of substantially greater thickness than the thickness of the record 16, thus protecting the record and its grooves 26 from engaging a supporting surface or adjacent records which may be stacked, as on the changer 10, or suspended as shown in FIG. 5, to be described. Generally radially extending ribs 46 are provided on opposite faces of the ring portion 44, and are preferably spaced apart as shown in FIG. 2, for effectively preventing rotation of adjacent records on the turntable 12 (FIG. 1).

With continuing references to FIGS. 2 and 3, an inner annular portion 50 of the ring is of substantially the same thickness as the record 16 to provide clearance for relatively wide cartridges 22, so that the needle 24 may properly seat on the record 16. The groove 32 is formed in the reduced inner annular portion of 50 of the the ring.

Figure 4:
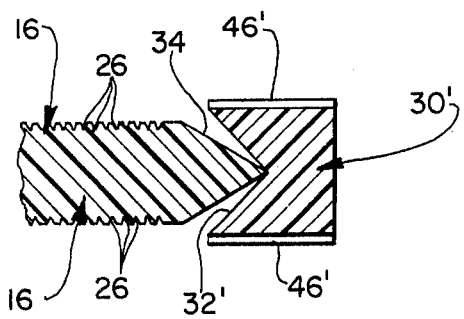
FIG. 4 is a fragmentary, sectional view similar to FIG. 3, but illustrating another embodiment of the invention.

With reference to FIG. 4, reference numerals primed, as 30', indicate similar or identical parts to those previously described, and these parts will not necessarily be further described. In this embodiment, the ring 30' is generally square and slightly thicker than the record 16, and is devoid of the outer annular portion 44 of the prior embodiment.

Eyes 41 provide for more convenient suspension of the records 16 from a support 56, as shown in FIG. 5. Support 56 is provided with a series of depending hooks 58, one hook for receiving each ring 30 or 30'. By provision of eyes 41, the hooks 58 may be disposed with their opening facing the person inserting the eye onto the hook or removing it therefrom. The record storage support shown in FIG. 5 permits convenient storage of the records on the support 56, such as a shelf above the records, the shelf protecting the records from dust and falling objects. If more compact storage is desired, as dead storage, the band 38 or eye 41 can be telescoped onto a rod, with the rings 30 or 30' abutting each other and thus preventing contact between the records.

While this invention has been described and illustrated with reference to particular embodiments in a particular environment, various changes may be apparent to one skilled in the art and the invention is therefore not to be limited to such embodiments or environment, except as set forth in the appended claims.

What is claimed is:

1. A phonograph record accessory for protecting the opposite faces and rim of a disc type phonograph record during playing and storage of the record, the accessory comprising, a ring having an inner face including means for receiving the rim of the record and retaining the ring operatively mounted on the record, said ring further having opposite outer annular face means for engaging similar face means of adjacent rings and protecting the record faces from engagement with adjacent record and rings, said annular faces means being spaced outwardly in opposite directions from the receiving means, said ring further having opposite end portions and therebetween a gap, and means including a band spanning said gap and interconnecting said opposite end portions of said ring, said band being resilient for facilitating stretching of the band during placement of said ring on the record rim and for drawing said end portions toward each other and retaining said ring on the record, and said band being spaced outwardly from inner face of said ring and including means in the form of an open eye for increasing stretchability of the band and for receiving a suspension member extending through said eye, for suspending the record from a support.

2. An accessory as set forth in claim 1 in which the ring includes securing means, one for each of said opposite end portions, for releasably retaining a resilient member operatively extending across said gap.

3. An accessory as set forth in claim 1 in which the ring has a generally rectangular cross-section.

4. An accessory as set forth in claim 3 in which the ring includes means on said annular face means for effectively preventing slippage between adjacent stacked records.

5. An accessory as set forth in claim 1 in which the ring has a relatively thin annular portion extending outwardly from said inner face for receiving relatively wide portions of a tone arm, and said ring further has a relatively thick annular portion radially outwardly of the thin portion and including said annular face means for preventing adjacent stacked records from engaging each other.

6. An accessory as set forth in claim 5 in which said annular face means includes means for effectively preventing slippage between adjacent stacked records.

7. An accessory as set forth in claim 6 in which the last said means includes ribs on said annular face means for effectively preventing slippage between adjacent stacked records.

8. An accessory as set forth in claim 1 in which the ring includes means on said annular face means for effectively preventing slippage between adjacent stacked records.

* * * * *